INVENTORS
PAUL L. ALSPAUGH
JOHN W. HEIMASTER
ROY L. McNEILL
BY Richard S. Shreve Jr.
ATTORNEY

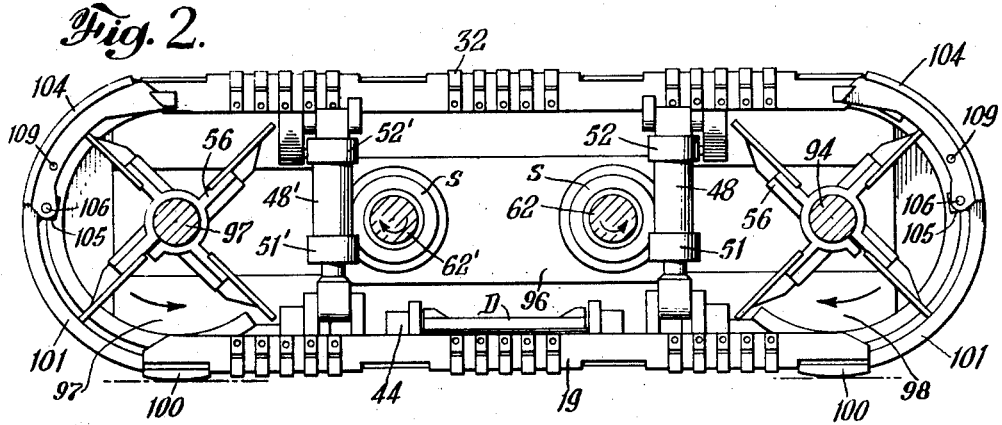
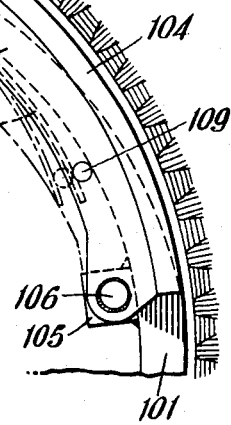
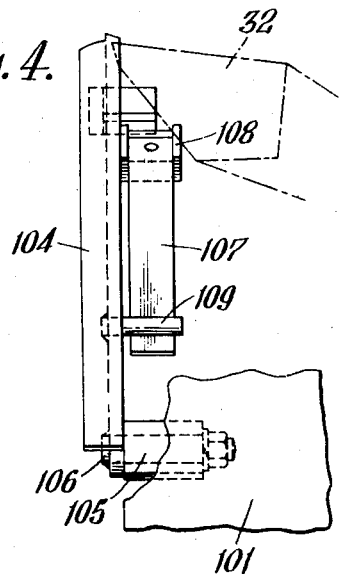
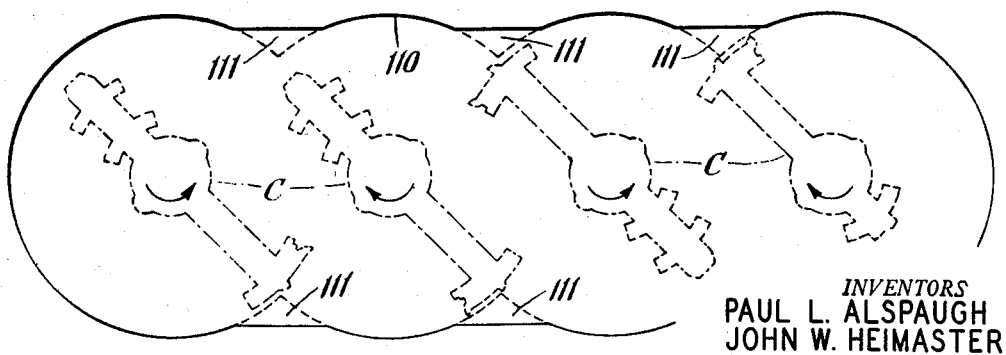

United States Patent Office 2,991,058
Patented July 4, 1961

2,991,058
CUTTER AND CONVEYOR MECHANISM FOR REMOTE CONTROLLED MINING MACHINE
Paul L. Alspaugh and John W. Heimaster, South Charleston, and Roy L. McNeill, Charleston, W. Va., assignors to Union Carbide Corporation, a corporation of New York
Filed Sept. 16, 1954, Ser. No. 456,363
17 Claims. (Cl. 262—7)

This invention relates to cutter and conveyor mechanisms for bore-mining machines of the type shown in our copending parent application Serial No. 353,932, filed May 11, 1953, now Patent No. 2,826,402, of which this application is a division.

The bore-mining machine according to our said parent application is provided with a driving head from which rotary cutting devices extend forwardly to engage the material being mined. Hard tipped bits on the rotary cutting devices cut circumferential grooves in the seam face, and break out the material between the grooves. The machine is also provided with conveyor means disposed under the driving head for transporting the cuttings rearwardly of the machine from which other conveying means load the cuttings into a hopper or trucks or wherever needed.

Objects of the present invention are to facilitate the transfer of the cuttings from the rotary cutting devices to the machine conveyor, to shroud the transfer parts to prevent escape of the cuttings during such transfer, to utilize part of the shrouding means for removal of cusps left between the rotary cutters at the top and bottom of the hole, to allow a certain amount of collapsibility for removal of the machine from the bore when loose material lies on the floor in the path of the machine, and to otherwise improve the construction and operation of the front part of the machine.

According to the present invention, the whole front portion or cutting end of the machine behind the cutting devices is enveloped or encased by a peripheral shroud so that the cuttings can escape only by way of the machine conveyor. The shroud is similar in shape but slightly smaller than the bore hole made in the earth by the cutting devices. Rotary paddles are mounted adjacent to the shroud behind the cutting devices and preferably on the same shafts as the outer cutters, for co-operating with arcuate recesses in the shroud to sweep the cuttings to the middle of the machine and onto the conveyor from opposite sides thereof. Parts of the shrouding means are expansible toward corresponding portions of the hole made by the cutting devices, to effectively seal the corresponding space against passage of material being mined from the front to the rear of the driving head. Part of the shrouding means comprises a roof scarfer for cutting cusps left depending from the ceiling of the bore hole made by the cutters.

In the drawings:

FIG. 2 is a view partly in front elevation and partly in section taken along line 2—2 of FIG. 1;

FIG. 3 is a fragmentary view mainly in front elevation of a detail of a part of the casing for the paddles shown in FIG. 2;

FIG. 4 is a view in side elevation of the detail shown in FIG. 3; and

FIG. 5 is a view in elevation showing an outline of a hole cut by the machine, the cutters being indicated in dotted lines.

Figure 1:
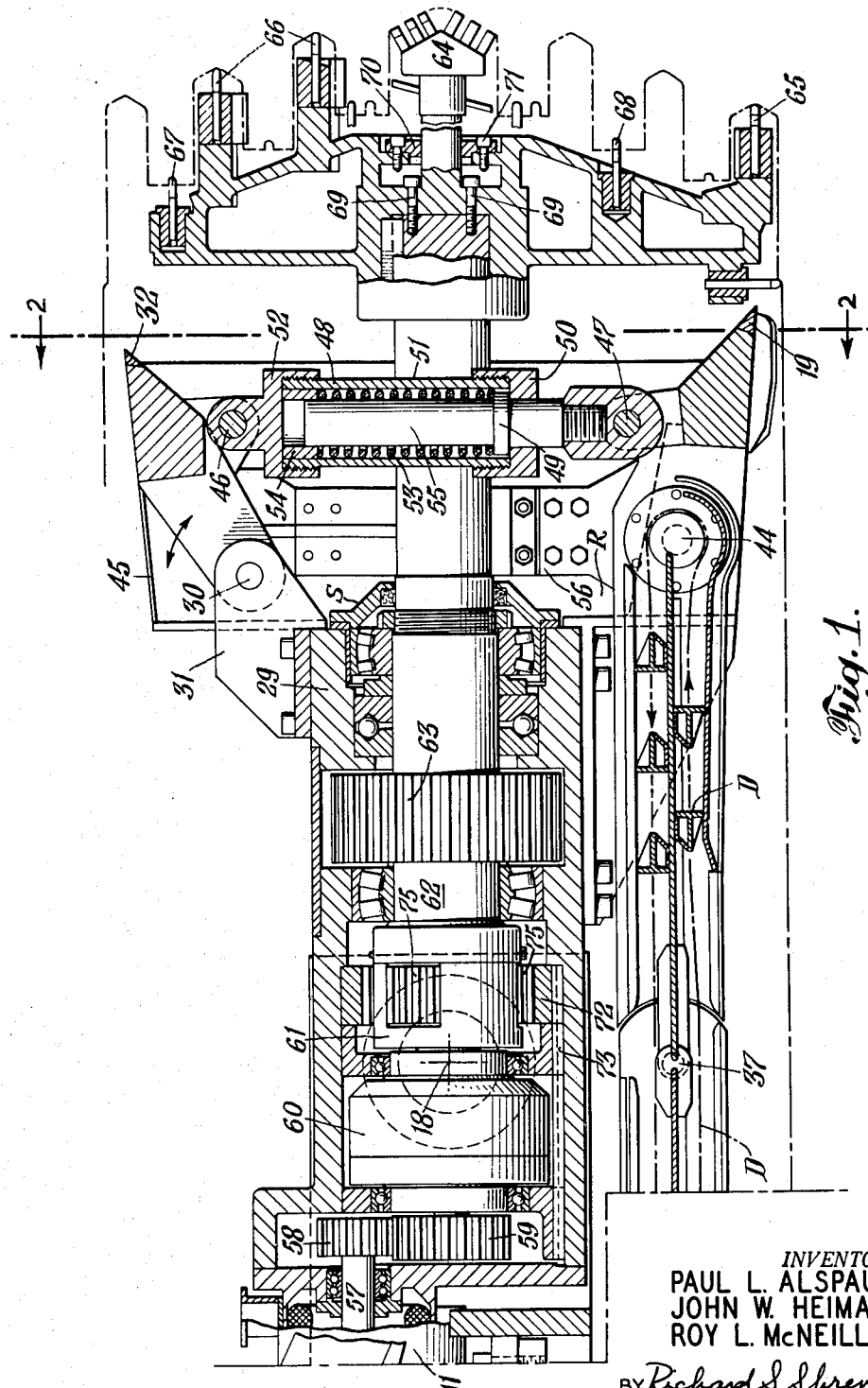
FIG. 1 is a sectional view of the front portion of a bore-mining machine.

The machine shown in the drawings comprises a driving head or gear box 29, which supports and drives rotary cutters C, and a machine conveyor D which passes the cuttings to the rear of the machine. A forward portion of the driving head 29 is enlarged to form a funnel section 45 which functions as a shroud to prevent loose particles of material being mined from escaping from the flight conveyor D. For removal of the cusps left between the rotatable cutters C at the top and bottom of the hole, transversely fixed blades 19 and 32 are provided at the front of the shroud. The lower blade 19, together with the gear box 29 and the lower portion of the shroud 45, constitute a lower head frame. In back of the clutters C, within recesses R in the shroud and between the blades 19 and 32 are rotary paddles 56 for sweeping cuttings onto the flight conveyor D from each side. These paddles rotate with the outer rotary cutters.

The rotary cutters C are driven by a pair of motors of which the nearer, motor 11, is shown, having a shaft 57, which through gears 58 and 59 drives a planetary reduction gear within the cage 61 to drive the cutter shaft 62 which is journaled in bearing support S. A gear 63 meshes with a corresponding gear on the other cutter shafts.

The rotary cutters C comprise bits 64 which cut a hole in the seam of the approximate shape indicated in FIG. 1. A radial outer cutter 65 on the longer arm of the rotatable cutter makes a circular slot in the seam face, and the cutters 66 form inner concentric slots, the material left between these slots being broken by the breaker teeth 67 and 68. The rotary cutters are secured to their driving shaft 62 by bolts 69, the heads of which are covered by a front end plate 70 secured in position by bolts 71.

The blade 32 at the top of the machine is pivotally mounted on pins 30 supported by a bracket 31 from the top of the gear box 29. This blade at the top is movable as a unit while the lower blade 19 is not adjustable or tiltable except as the head tilts. The portion of the flight conveyor D between the pivot 37 and the forward roller 44 is moved with the cutting head. The pivot axis 37 is vertically aligned with the pivotal axis 18 of the cutting head but is located therebelow.

The upper cusp cutting blade 32, which is pivotal as a unit about the axis 30, is also connected to the pivot pin 46 constituting a substantially non-yieldable abutment against which blade 32 is non-yieldable upwardly yet is yieldable downwardly. This abutment is pivotally secured at 47 to the lower blade 19. An enclosing tube 48 threadedly engaged with ring 50 cooperates with a flange 49 to prevent upward movement of the blade 32, the same being connected through a ring 52 threaded to tube 48. Any upward movement of the blade 32 is resisted by the flange 49 engaging the ring 50 to prevent such upward movement. However, this blade 32 is free to yield downwardly under compression of the spring 53 enclosed within the tube 48. A spacer ring 54 between the ring 52 and spring 53 outside post 55 permits a downward yield of the upper blade 32 by an amount equal to the space between ring 52 and the top of the post 55 as the spring 53 is compressed.

As shown most clearly in FIG. 2, there is a relatively large space or opening 96 located beneath the two bearing supports S for the shafts 62 and 62' and between the axes of rotation thereof above the receiving end of the conveyor D, and similar relatively large laterally located spaces 97 and 98 through which the recesses R open forwardly toward the forward portion of the head mechanism near the floor level, and into which the dislodged and disintegrated mineral is discharged from the head mechanism.

Thus it will be seen that the machine has a relatively large zone of accumulation within the head rearwardly of the rotary boring instruments so that the disintegrated mineral may flow relatively freely through the large front opening into such zone of accumulation and the rotary conveyor devices 56 within the head engage the disintegrated mineral accumulated within the head and move it laterally over the sides of the front conveyor D.

Referring to FIGS. 3 to 5, wear-resisting pads 100 ride over the floor on movement of the machine in each direction. The upper blade 32 is shown in FIG. 3 capable of being downwardly yieldable as the machine is retracted from a hole just cut. A casing or shroud 101 is provided around the outside of each of the paddles 56 to reduce the likelihood of pieces of coal getting back of the front gear box. A clearance of space 102 is provided around the casing and the inner surface of the bore made by the machine in the seam B. Here the main casing 101 for the paddles is provided with a yieldable quadrant 104 constituting an auxiliary shroud part pivoted at 106 to the block 105 which is part of the casing 101. A leaf spring 107 is secured by the bolts illustrated or passing through a block 108 into the main portion of casing 101. A pin 109 is secured on the inner face of the auxiliary shroud 104 to be engaged by the leaf spring 107, FIGS. 3 and 4.

During movement of the machine out of its hole, not only is the upper blade 32 yieldable downwardly, but also the auxiliary shroud parts 104 are also yieldable inwardly and downwardly against the action of springs 107.

In FIG. 5 the outline of the front cutters is shown in dotted lines with the direction of rotation of these cutters being indicated by arrows. The outline 110 shows the shape of the hole. The dotted lines 111 show the cusps of coal not removed by the cutters but which are removed by the blades.

We claim:

1. In a bore-mining machine having laterally spaced face cutters which are oppositely rotatable, motor means on said machine for driving said cutters, cutting means mounted on such machine between said cutters at the top and bottom of the machine for cutting off cusp shaped material left between the cutter paths, at least one of said cutting means being pivotally mounted to yield inwardly as said machine is retracted from a cut hole, yieldable means for supporting said pivotally mounted cutting means, an abutment against which said yieldable means is held during forward cutting movement of said machine, and spring means cooperating with said yieldable means to press the same against said abutment and against which said yieldable means pivotally swings during retraction of said machine.

2. In a bore-mining machine as claimed in claim 1, the combination of a front gear box, rotary cutting head means mounted on the front of said gear box, conveyor means disposed under the bottom of the gear box for transporting the material being mined rearwardly of the machine, and means completely circumferentially shrouding the front portion of the machine including said gear box and said conveyor behind said rotary cutting head means, which shrouding means is similar in shape but slightly smaller than the bore hole made in the earth by said rotary cutting head means, a part of said shrouding means being pivotally mounted to yield with said pivotally mounted cutting means.

3. In a bore-mining machine, the combination of a front gear box, rotary cutting head means mounted on the front of said gear box, conveyor means disposed under the bottom of the gear box for transporting the material being mined rearwardly of the machine, means peripherally shrouding the front portion of the machine including said gear box and said conveyor behind said rotary cutting head means, which shrouding means is similar in shape but slightly smaller than the bore hole made in the earth by said rotary cutting head means, said shrouding means being provided with arcuate recesses located behind said rotary cutting head means adjacent opposite sides of the front of said gear box, and rotary paddle means mounted behind said rotary cutting head means to rotate within such arcuate recesses for cooperating therewith to sweep material being mined onto the conveyor from opposite sides thereof.

4. In a bore-mining machine having laterally spaced rotary face cutters, conveyor means for transporting the material being mined rearwardly of the machine, cutting means between said cutters for cutting off cusp shaped material left between the cutter paths, one of said cutting means being pivotally mounted to yield inwardly as the machine is retracted from a cut hole, yieldable means for supporting said pivotally mounted cutting means, and spring means urging said yieldable means outwardly.

5. In a mining machine having laterally spaced face cutters which are oppositely rotatable, motor means on said machine for driving said cutters, cutting means mounted on such machine between said cutters at the top and bottom of the machine for cutting off cusp-shaped material left between the cutter paths, at least one of the said cutting means being pivotally mounted to yield inwardly as said machine is retracted from a cut hole, yieldable means for supporting said pivotally mounted cutting means, an abutment against which said yieldable means is held during forward cutting movement of said machine, and spring means cooperating with said yieldable means to press the same against said abutment and against which said yieldable means pivotally swings during retraction of said machine.

6. In a mining machine as claimed in claim 5, the combination of a front gear box, rotary cutting head means mounted on the front of said gear box, conveyor means disposed under the bottom of the gear box for transporting the material being mined rearwardly of the machine, and means completely circumferentially shrouding the front portion of the machine including said gear box and said conveyor behind said rotary cutting head means, which shrouding means is similar in shape but slightly smaller than the hole made in the earth by said rotary cutting head means, a part of said shrouding means being pivotally mounted to yield with said pivotally mounted cutting means.

7. In a mining machine, the combination of a front box, rotary cutting head means mounted on the front of said box, conveyor means disposed under the bottom of the box for transporting the material being mined rearwardly of the machine, means peripherally shrouding the front portion of the machine including said box and said conveyor means behind said rotary cutting head means, which shrouding means is similar in shape but slightly smaller than the hole made in the earth by said rotary cutting head means, said shrouding means being provided with recesses located behind said rotary cutting head means adjacent opposite sides of the front of said box, and conveyor means mounted behind said rotary cutting head means and within such recesses for cooperating therewith to convey material being mined onto said first mentioned conveyor means from opposite sides thereof.

8. In a mining machine, the combination of a front structure, rotary cutting head means mounted on the front of said structure, conveyor means disposed under the bottom of the structure for transporting the material being mined rearwardly of the machine, means peripherally shrouding the front portion of the machine including said structure and said conveyor means behind said rotary cutting head means, which shrouding means is similar in shape but slightly smaller than the hole made in the earth by said rotary cutting head means, said shrouding means being provided with recesses located behind said rotary cutting head means adjacent opposite sides of the front of said structure, and conveyor means mounted behind said rotary cutting head means and within such recesses for cooperating therewith to convey material being mined onto said first mentioned conveyor means from opposite sides thereof.

9. In a mining and loading apparatus, a disintegrating head mechanism comprising in combination a lower head frame, a series of coacting rotary boring instruments mounted on said head frame in parallel overlapping relation, said head frame carrying bearing supports in which said boring instruments are journaled, said head frame having a series of openings therein located beneath said bearing supports between the axes of rotation of said boring instruments comprising a central opening and a pair of side openings, said head frame having chambers therein rearwardly of said side openings to provide a zone of accumulation for the disintegrated mineral within said head frame, a centrally located conveying means extending into said zone of accumulation within said head frame with its forward receiving portion extending into said central opening, the disintegrated mineral flowing through said side openings into said chambers, and conveying means within said chambers rearwardly of said side openings for engaging the disintegrated mineral in said zone of accumulation and for moving such mineral laterally onto said centrally located conveying means.

10. A mining and loading apparatus as set forth in claim 9 wherein said last mentioned conveying means for moving the mineral laterally as aforesaid comprises a pair of cooperating rotary conveyor devices arranged in said chambers and journaled on longitudinal parallel axes at the opposite sides of said centrally located conveying means with the latter located intermediate said axes of said rotary conveyor devices.

11. In a mining and loading apparatus, a mine vein disintegrating head mechanism comprising, in combination, a head frame, a centrally located conveyor extending forwardly into said head frame, a series of four coacting rotary boring instruments mounted on said head frame on parallel longitudinal axes, said conveyor having its forward receiving portion located intermediate the two inner parallel axes, chambers arranged in said head frame at the opposite sides of said conveyor for receiving mineral disintegrated by said boring instruments, and rotary conveyor devices arranged in said chambers for engaging the disintegrated mineral therein and for moving such mineral laterally onto said conveyor over the sides of the latter.

12. In a mining and loading apparatus, a disintegrating head mechanism comprising, in combination, a head frame, a series of coacting rotary boring instruments arranged in side-by-side overlapping relation on parallel longitudinal axes, bearing supports carried by said head frame in which said boring instruments are journaled, said head frame having a series of openings below said bearing supports comprising a central opening and a pair of side openings, conveying means extending longitudinally into said head frame between said side openings with its forward receiving portion lying within said central opening, and conveying means within said head frame for receiving loose mineral flowing rearwardly through said side openings and for moving such mineral laterally onto said first mentioned conveying means.

13. A mining and loading apparatus as set forth in claim 12 wherein said second mentioned conveying means comprises a pair of rotary conveyor devices journaled within said head frame at the opposite sides of said first mentioned conveying means.

14. A mining and loading apparatus as set forth in claim 12 wherein an upper disintegrating device cooperates with said series of coacting rotary boring instruments in the disintegration of the mineral and arranged at the roof level above said boring instruments, and said head openings also receiving the mineral disintegrated by said upper disintegrating device.

15. In combination, a frame structure movable over the floor of a mine, a dislodging and disintegrating head mechanism carried at the forward portion of said frame structure for dislodging and disintegrating the mineral of a solid mine vein, said frame structure providing chambers into which the dislodged and disintegrating mineral is discharged from said head mechanism, said chambers opening forwardly toward the forward portion of said head mechanism near the floor level, a conveying means extending centrally lengthwise of said frame structure between said chambers near the lower portions of the latter, conveyor devices on said frame structure rearwardly of said dislodging and disintegrating head mechanism and located within the longitudinal projection of the outer boundaries of said head mechanism, said chambers having closed outer sides and opening at their inner sides toward said conveying means, said conveyor devices acting on the mineral dislodged and discharged rearwardly by said head mechanism to move such mineral laterally toward and inwardly beyond the sides of said conveying means, and means for concurrently moving said conveyor devices as aforesaid to effect their conveying function.

16. A combination as set forth in claim 15 wherein said conveyor devices comprise rotary impellers disposed in said chambers on parallel axes extending longitudinally of said frame structure, one impeller at each side of said conveying means.

17. A combination as set forth in claim 15 wherein said movement of said conveyor devices is a rotary movement.

References Cited in the file of this patent
UNITED STATES PATENTS

| | | |
|---|---|---|
| 287,728 | Rothschild | Oct. 30, 1883 |
| 2,595,398 | Lewis | May 6, 1952 |
| 2,694,562 | Snyder et al. | Nov. 16, 1954 |
| 2,777,681 | Ball | Jan. 15, 1957 |